July 26, 1949.  D. E. SUNSTEIN  2,477,395
APPARATUS FOR CONTINUOUSLY PREDICTING
A TREND IN OBSERVED DATA
Filed April 12, 1945  4 Sheets-Sheet 1

INVENTOR.
DAVID E. SUNSTEIN
BY
Ostrolenk and Faber
ATTORNEYS

INVENTOR.
DAVID E. SUNSTEIN
BY Ostrolenk and Faber
ATTORNEYS

INVENTOR.
DAVID E. SUNSTEIN

BY

Ostrolenk and Faber

ATTORNEYS

Patented July 26, 1949

2,477,395

UNITED STATES PATENT OFFICE 2,477,395

APPARATUS FOR CONTINUOUSLY PREDICTING A TREND IN OBSERVED DATA

David E. Sunstein, Elkins Park, Pa., assignor to Philco Corporation, a corporation of Pennsylvania Application April 12, 1945, Serial No. 588,026

14 Claims. (Cl. 177—311)

My invention relates to the method of and means for indicating the trend of values of devices during the process of manufacture thereof, and more specifically relates to apparatus and methods for continuously and visually producing a constantly changing curve showing at any instant the distribution of the values of a predetermined number of devices made just prior to that instant.

In production testing any manufactured article, it is desirable in order that the quality of the manufactured product may be controlled to know during the manufacturing operations the distribution curve resulting from any given test imposed on the manufactured article. Thus, for example, in the manufacture of resistors, test data on the resistance values of sample lots of resistors are made. If the resistance value of the resistors deviates beyond predetermined limits, corrections should be made in the manufacturing process in order to bring the resistance values of further resistors manufactured within the prescribed limits.

Methods of effecting such control has been the subject of extensive investigation but heretofore no commercially satisfactory arrangement has been devised due to a number of factors. For one thing, the indications provided by any one batch of resistors may be misleading unless it is related to test results preceding and following such test results. Thus for example, if in the manufacture of resistors whose desired resistance is 100 ohms, the resistors deviate within a permissible value on either side of this value, the resistors are acceptable. Moreover, deviations beyond this permissible value are to be expected for a reasonable percentage of the manufactured resistors. If these conditions obtain, no change in manufacturing process should be made notwithstanding the fact that same resistors may have values outside the permissible deviations.

It is accordingly desirable that the manufacturing control shall be in accordance with the test results which continuously show an overall picture of the manufacturing process.

A further factor in manufacturing control is the time element. Test data used in manufacturing control must be of the latest devices made since otherwise controls opposite in nature from those which should be made may be effected due to changes which have occurred in the manufacturing process since the last test. Thus if the latest tested resistors mentioned above indicate values which are too high and if this fact is noted only after a change has occurred in the manufacturing process so that resistors coming off the production line are too low, a further correction toward lower value will be disastrous to production.

Statistical methods heretofore employed have had both the defects that they did not correlate results of a number of units and that the recording and relaying of such information to the production department had a time lag which rendered the data secured relatively untrustworthy for production control.

Accordingly, a primary object of my invention is to provide novel apparatus for and methods for automatically anayzing and indicating (preferably graphically) at any instant the distribution of values of a predetermined number of devices manufactured just prior to that instant.

Another object of my invention is the provision of novel apparatus for and methods for automatically and graphically indicating on a curve the distribution at any instant of resistance values of a predetermined number of resistors tested just prior to that instant.

When such instantaneous indication is obtained at any moment for a predetermined number of devices made just before that moment, it becomes possible for the test operator himself readily to determine the degree to which the distribution of the devices tested fits within the desired test limits. Therefore the operator can instantaneously obtain accurate information to communicate to the operator of the apparatus which fabricates the devices to enable him to make an immediate adjustment.

By this means therefore, production difficulties can be corrected before they are actually of sufficient magnitude to cause rejections. Indeed the tendency of the distribution of the devices along the curve, for the particular characteristic tested, to shift away from a centrally positioned distribution curve toward either a high or low limit can be foreseen before a significant quantity of units is rejected.

Automatic and instantaneous control is therefore made possible to analyze and instantaneously control this trend and thereby to restore the distribution of the articles and their curve so that it is properly centered with respect to the tolerances. In fact, the control of the manufacturing operations can, by the system and apparatus of my invention, be automatically achieved. The average value of the distribution can be automatically measured and the result of this measurement can automatically be used to control the apparatus fabricating the device under test in the proper direction so as to restore the distribution curve to its proper value.

As pointed out above, in the manufacture of devices of the general character described, it is sometimes not alone sufficient that these devices classify generally in a proper manner over a distribution curve, but also that the specific number of devices for any individual group within the predetermined number so distributed should not exceed a certain number. Thus, for instance, my novel system and apparatus provides an indication at any instant of the distribution of the last 80 resistors or other devices made just prior to that instant. For example, where the resistor is to have a resistance of 100 ohms, a distribution curve may be: 2 resistors at 88 ohms; 8 at 92 ohms; 17 at 96 ohms; 25 at 100 ohms; 17 at 104 ohms; 8 at 108 ohms; 2 at 112 ohms; and 1 at 116 ohms, (all the grades being plus or minus 2 ohms).

In the case of a distribution of this type where the number of resistors within the 100 ohm classification increases substantially beyond the curve thus indicated, the result is satisfactory, possibly indicating, however, unnecessarily narrow limits of tolerance earlier in the process. Where, however, even though the distribution curve is generally maintained, the number of resistors testing at 104 ohms increases to a substantial degree, say beyond 20, for the last batch of 80, then even though the distribution curve may generally be bell-shaped, instantaneous means should exist for immediately indicating the fact that a relatively large number of resistors is being made which varies in one direction from the optimum.

Accordingly another object of my invention is the provision of means in connection with the indicating and testing system above described, for creating an aural or visual alarm or a combination of both when the number of devices for a specific classification within the distribution curve exceeds a maximum limit. Again the indication here given may be one which automatically stops the manufacturing operation or which automatically adjusts the manufacturing operation in accordance with the excessive variation thus indicated.

The essence of my invention resides in obtaining a distribution curve which gives at any instant the distribution of a particular characteristic of a predetermined number of devices, the devices having been made and tested just prior to that particular instant.

Another object of my invention therefore, is the arrangement of a system and apparatus whereby after the predetermined number of devices have been made and tested, the making and testing of an additional device and the adding of the test result thereof to the distribution curve will result in simultaneous subtraction from the distribution curve of the test result of the earliest device made, i. e., just prior to the predetermined number which includes the latest device. By this means, therefore, the distribution curve is constantly changing, always showing test results of a predetermined number N (such as 80) of devices made and always giving an immediate and clear picture of the distribution.

Where it is desired to determine a trend, that is, the direction of shift in the distribution curve, it is only necessary to watch the distribution curve as a number of devices are made and determine the direction in which the constantly changing curve shifts.

Recording means may also be provided in connection with my novel system to record the distribution curve from instant to instant and thus provide a graphic illustration not merely of the distribution curve at any instant but of the degree and direction of shift of the distribution curve.

Accordingly, still another object of my invention is the provision of means for determining at any instant the test result distribution of a predetermined number of devices made just prior to that instant and for determining the trend of the distribution curve over a relatively short period of time so that corrections may be made before the distribution curve approaches a point where rejections occur.

Heretofore where devices were manufactured and tested, it has been necessary individually to test the devices and make a statistical analysis and chart a distribution curve. Since this is a relatively slow and tedious operation, it was found desirable to make sample tests rather than slow up the operation of the manufacturing process. Therefore sample devices were selected at random from the production batch, as close to the manufacturing process as possible, and analyzed, the distribution curve studied and the fabricating process adjusted accordingly. Such tests, even though made at frequent intervals from relatively large samples, never gave an instantaneous indication and always provided a record simply of what the production quality had been a substantial time before.

Sometimes the only method for determining that the fabricating machine or process was producing devices which were not distributed properly along the curve was by information given by the test operator that "too many" of the devices exceeded or were below specification. Thereupon the machine was slowed up, adjustments were made, and the devices carefully tested until the proper distribution was obtained.

By the utilization of my novel system and apparatus, instantaneous indications are given continuously of the distribution of the devices along the curve for a particular characteristic. Not only will my novel system and apparatus provide such an instantaneous indication but it will also indicate the trend. Thus, even though the distribution curve may at any instant become unbalanced, watching the change in the curve over a short period will make possible the determination whether the distribution is correcting itself or whether the apparatus requires adjustment and correction.

A further object of my invention therefore is a provision of a system and apparatus for determining the distribution of devices along the curve for a particular characteristic, which system and apparatus will avoid the necessity for complex tedious and production - delaying statistical analysis.

Still another object of my invention is to provide novel means for tabulating the results of tests or other data on a distribution curve.

In addition to the above described operations, it is often desirable to employ my novel system for the control of manufacturing operations. This can be accomplished by obtaining an average value, or the mean or standard deviation of the devices from a prescribed value.

Accordingly, an object of my invention is to provide means whereby the average value of the quality of a manufactured product may be determined directly from a meter reading.

A further object of my invention is to provide means whereby the standard deviation of the quality of the manufactured product can be obtained from a meter reading.

Still a further object of my invention is to provide means whereby the manufacturer's process can be adjusted in accordance with the average value indicated by the invention, and means can be arranged whereby a manufacturing process can be shut off and an alarm given whenever the standard deviation of the products being manufactured is beyond an established value.

Another object of my invention is to provide a novel arrangement which in conjunction with the previously described apparatus for showing the quality curve of a manufactured product, will provide readings proportional to the average value of this curve and proportional to the mean square deviation of this curve.

A further object of my invention is to provide means to enable these indications to be obtained in such a manner that they could be used to control the manufacturing process.

Still a further object of my invention is to provide means for obtaining from the distribution curve of the test on the manufactured product, those quantities which are of most value to interpret this distribution curve, namely the average value and the root mean square deviation.

The foregoing and many other objects of my invention will become apparent from the following description and drawings, in which.

Generally, in order to indicate automatically the distribution of a given characteristic of a product, my novel method includes the following steps:

The device is tested unit by unit by a suitable means commensurate with the particular product and the characteristic for which the test is made. Each unit test is such as to give information classifying the particular unit under test into one of a plurality of groups, each group representing numerical differences of quality of the product. The information so obtained is used to actuate a multiplicity of counters, one counter for each group. The particular counter corresponding to the particular group into which a particular component falls is advanced one unit for every device under test which shows by the test that it falls into the group represented by the particular counter.

The information obtained from the test which feeds the group of counters is also supplied to a group of storage devices, which indicate the particular sequence of groups into which the characteristics of the tested device falls. Whenever a given counter is actuated by a component under test falling into the particular group for that counter, a particular storage element is simultaneously actuated. The storage elements function so that any given actuation therefor is retained for a predetermined number of successive tests after the given test. The storage system supplies to the apparatus a means indicating that the given test classified the device under test into a predetermined group. This storage element is subsequently used to subtract one unit from the counter reading previously obtained for that group at the end of the predetermined number of intervening tests.

Thus as the devices are tested, a given counter will be advanced one unit if the device under test falls into a category represented by that counter; and after a predetermined number of successive tests that same counter will have whatever count is then indicated thereby reduced by one unit. In this manner the counters will indicate the distribution curve of the predetermined number of devices last tested and this indication of a distribution curve will always be maintained up to date or rather up to the particular instant.

Figure 1:
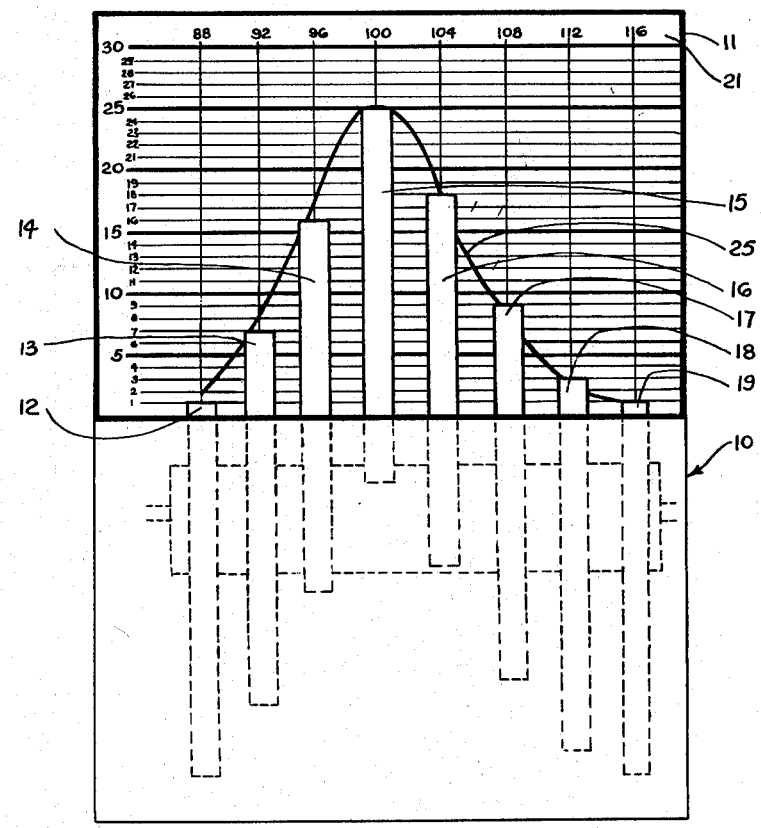
Figure 1 is a front view of the indicator operated by the novel system and apparatus of my invention for showing at any instant the distribution of a predetermined number of devices made just prior to that instant over a curve for a particular characteristic.

Referring now to Figure 1, the indicating device comprises a housing 10 having an opening 11 in which indicating counters 12, 13, 14, 15, 16, 17, 18 and 19 are visible. The indicating counters 12—19 comprise a plurality of vertically movable rods (or appropriately colored extensions of vertically movable rods), the said rods or counters moving in front of a vertical scale card 21. The indicating device 10 and its scale card 21 are shown arranged for the graphical and instantaneous analysis and indication of the distribution curve of the quality or value of 80 units.

As previously pointed out, when the value of the 81st unit is at any instant added to the indicating device so as to elevate one of the counters 12–19 by one step, the first of the prior 80 indications stored in the indicating device is subtracted. Thus, for instance, if the units being tested are resistors, and if at any instant the first of the 80 resistors graphically shown was one which had a test value of 96 ohms and if at that instant the 81st resistor has a test value of 100 ohms, then the counter 15 for 100 ohms is raised one step and the counter 14 for 96 ohms is sumultaneously lowered one step.

If in the foregoing example the first and the 81st resistor each tested at 100 ohms, the counter 15 remains stationary. Therefore the indicating device of Figure 1 continuously shows at any instant the quality of the last 80 devices manufactured. The scale card 21 is here calibrated for resistors which are to have an ohmic value of 100 and the various other values along which the distribution curve is plotted are given groups of plus or minus 2 ohms.

The type of distribution curve shown in Figure 1 demonstrates that the distribution is approximately correct at the particular instant shown with a fairly even substantially bell-shaped curve and a low number of resistors testing at extreme values. The distribution curve shown in Figure 1, however, gives an indication of a trend toward a higher value. This is so because counter 17 for 108 ohms is shown slightly higher than counter 12 for 92 ohms, counter 18 is shown at a higher level than counter 12, and counter 16 is shown at a higher level than counter 14. Should the curve shift slightly so that any of counters 16, 17, 18 and 19 rise a step and any of the counters 12 to 15 drop a step, that will be an instantaneous indication that the trend of the distribution curve is toward excessive resistance and immediate correction should be made to restore the distribution curve to balance.

For various testing purposes, different optimum curves may be preferred and the scale card 21 may have a standard distribution curve 25 printed or drawn thereon so that the operator will obtain an immediate indication of variation in the distribution curve.

It will be obvious that so long as counter 15 extends above the standard curve 25 and all the other counters below the standard curve 25, that a curve which is even better than the standard distribution curve is obtained and relatively little adjustment need be made unless a trend appears showing a possibility of an abnormal number of resistors having too high or too low an ohmic value.

The condition of the indicator of Figure 1 will obtain only when the indicator has not been watched for a few moments since the fact that counters 16, 17 and 18 are above the optimum curve 25 provides an indication of a trend toward too high an ohmic value. Correction will ordinarily have been made of the apparatus before the positions of counters 16, 17 and 18 of Figure 1 will have been reached.

Figure 2:
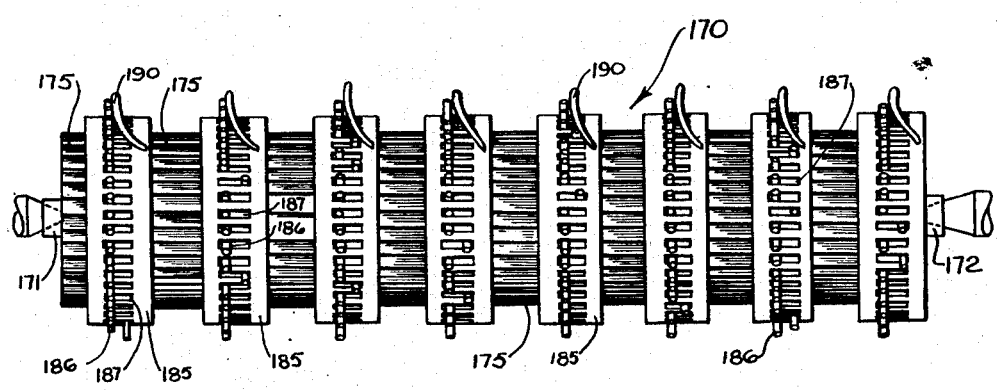
Figure 2 is a side view of the operating drum of my novel system and apparatus, which drum regulates the number of devices shown at any instant on the distribution curve of Figure 1 by subtracting from the curve of Figure 1 continuously as devices are added thereto, devices which at any instant fall outside the predetermined number.
Figure 3:
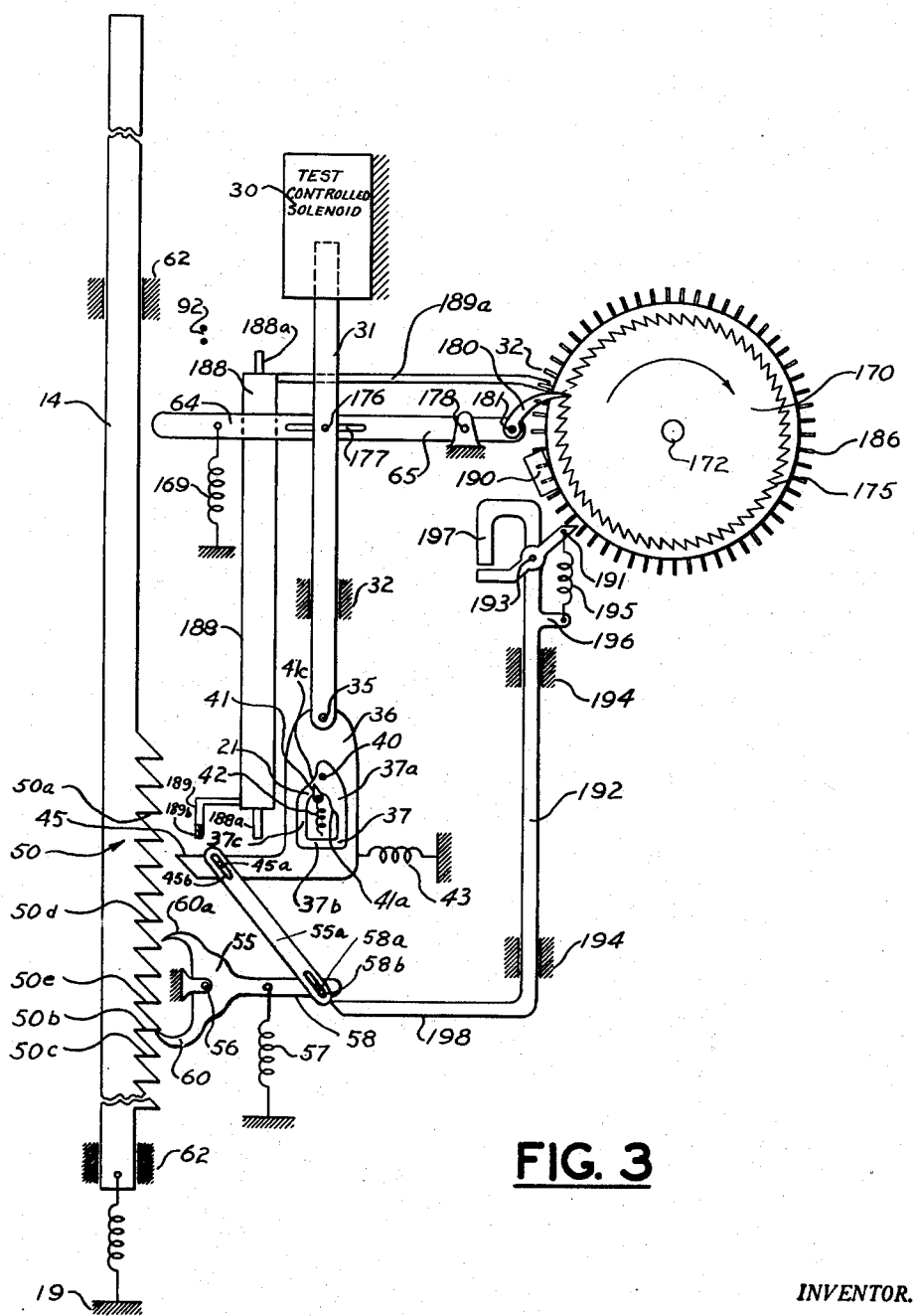
Figure 3 is a side view of a portion of the apparatus of Figures 1 and 2, showing the specific means by which the individual indicating elements of Figure 1 may be operated into position.

The counters 12 to 19 extend below the viewing portion 11 of the indicator 10 into a housing wherein the apparatus shown in Figures 2 and 3 is contained for actuation of the counters in accordance with received test information.

In Figure 3 I have shown the actuating means individual to one of the counters.

The apparatus hereinafter described in connection with Figure 4 may be utilized selectively to operate the particular actuating means for individual counters in accordance with the individual characteristics of the particular device passing through the test.

When, for instance, a particular resistor having an ohmic value of 96 ohms passes through the analysis device, it will energize the solenoid 30 (Figure 3) for counter 14 to attract and raise the rod 31 which slides in guide 32. Rod 31 is pivotally connected by pin 35 to the cam member 36 having the recessed guide 37. A stationary pin 40 enters recessed guide 37 of cam 36 and predetermines the motion of cam 36 as it is drawn up by rod 31 and then is permitted to drop once more.

As cam 36 rises, pin 40 is guided by latch 41 (on member 36), spring biased by spring 42 to the position shown, to enter section 37a of the recess 37. Latch 41 cooperates with the recess 41a in section 37a and the bulge 41c in section 37c of the recess to ensure the entry of pin 40 into section 37a. The cam 36 thus pivots clockwise on pin 35 against the tension of its restoring spring 43 to drive pawl 45, which is an extension of cam 36, against the teeth 50 at the lower end of rod 14.

Pawl 45 now driven into engagement with teeth 50 will, as member 36 continues to rise, pull up the tooth 50a which it engages and hence will push up rod 14. This raising movement of rod 14 is limited to one step on scale 21 of Figure 1 by appropriate adjustment of the travel of rod 31 with respect to solenoid 30 and by engagement of pin 40 at the bottom 37b of recess 37.

Escapement latch 55 is pivotally mounted at 56 and is spring biased by tension spring 57 engaging arm 58 to a position where its lower pawl member 60 supports rod 14 in the particular position to which it is raised. The detailed mechanism of the member 14 and its associated parts shown schematically here, are more fully disclosed in Miller, "Telephone Theory and Practice," volume III (McGraw-Hill).

When rod 14 is raised by pawl 45 engaging tooth 50a, tooth 50b is drawn away from pawl member 60. At the same moment, pin 45a on pawl 45 and pin 58a on arm 58 of escapement 55 reach the ends of their permitted travel in slots 45b and 58b, respectively, of link 55a, and lower pawl 60 of escapement 55 is withdrawn from tooth 50b of rod 14, spring 57 being tensed.

Recess 37 of cam 36 then is raised to the point where pin 40 has moved down portion 37a of recess 37 to portion 37b. Tension spring 43 may now pull cam 36 counterclockwise about its pivot 35 to pull pawl 45 out of engagement with tooth 50a. As pawl 45 moves to the right, but before it disengages the teeth of rack 50, spring 57 is permitted, by the motion of link 55, to pull lower pawl 60 into engagement with tooth 50c.

At this time rod 14 has thus been raised one step and is held in the new position by reason of the fact that pawl 60 has been moved from beneath tooth 50b to beneath tooth 50c.

On deenergization of the solenoid 30, rod 31 drops and cam 36 moves down so that its recess portion 37c moves down with respect to stationary pin 40, pin 40 moves past the bulge 41c and latch 41 moving it aside to do so, and the elements are restored to the position shown in Figure 3.

Appropriate additional mechanism may be added, such as guides 62 for rod 14, contacts 92 which are operated (as hereinafter described) by the end 64 of arm 65 to deenergize solenoid 30 at the end of the upward stroke, and an appropriate storage device for subtracting the first of a predetermined number of indications as a new one is added.

It is obvious that the apparatus herein described for rod 14 is duplicated for each of rods 12, 13, 15, 16, 17, 18 and 19. The particular solenoid 30 for the particular rod is energized in accordance with the test characteristics of the device under test, the apparatus of Figure 4 selecting the particular solenoid to be energized.

The test indicia storage device above referred to comprises the drum 170 (Figures 2 and 3) which extends across all of the rods. Drum 170 is freely rotatable in its bearings 171 and 172 and comprises a series of racks 175 each individual to a particular rod and a series of test indicia storing wheels 185 each of which is also individual to a specific rod 12-19.

When the rod 31 (which operates indicating rod or counter 14 of Figure 3) is raised, the pin 176 carried thereby which engages slot 177 of arm 65 raises end 64 of the arm 65 about the pivot 178 against the tension of spring 169. This depresses the opposite end of arm 65 carrying the pawl 180. Pawl 180 is substantially free for counterclockwise movement about its pivot 181, being restrained preferably only by the action of a small spring omitted from the drawing for clarity. Pawl 180 engages the particular rack 175 arranged for cooperation with the operating elements for rod 14.

When the end of arm 65 carrying pawl 180 is depressed by raising rod 31, pawl 180 rides down the chamfered surface of the tooth on rack 175 which it engages and enters beneath that tooth. When arm 65 is then restored to the original position of Figure 3, the pawl 180 raises the particular tooth of the rack 175 which it engages and thus rotates the entire drum 170 one step.

Whenever any similar operation occurs with respect to any of the indicating rods 12-19, drum 170 is thus rotated one step.

The indicia storing wheels 185 each have a plurality of pins 186 projecting radially therefrom. Each of the pins 186 is mounted in an individual slot 187 for movement parallel to the axis of drum 170 within the limits determined by the length of slot 187.

Where the test and analysis device is to distribute the quality or value of eighty devices along a curve for a particular characteristic, then each of the eight wheels 185 on drum 170 will have more than eighty pins 186 (depending on the resetting distance for plate 190 hereinafter described).

A crank lever 188, pivoted at 188a, is arranged so that the tapered face 189b of one arm 189 is struck and moved aside by pawl 45 when cam 36 is raised; its other arm 189a is then moved into engagement with a specific pin 186, the end of arm 189a being curved to move the pin to the right (with respect to Figure 2). This occurs on the up-stroke of rod 31, and a spring, not shown, returns lever 188 to its initial position as pawl 45 drops and before drum 170 moves.

Thus, prior to every time the drum 170 is rotated by pawl 180 of the mechanism for rod 14, a pin 186 on wheel 185 for that rod at a specific angular position is pushed over to the right.

When the drum 170 is rotated by the mechanism for say, rod 15, then the pin 186 on the wheel 185 for that particular rod is pushed over to the right; while all the other pins (on the other wheels) axially aligned with the pin which is pushed over, remain in their original left hand position.

Thus, at every test the whole drum is rotated one step by the operation which advances a particular rod 12-19; but only a pin 186 on the wheel 185 for the particular rod advanced will be pushed over, the other pins on other wheels along that line being unaffected.

Thus, for any angular section of the drum 170, only one of the eight pins 186 along that section will be pushed to the right.

The drum is so made that the distance clockwise around the drum 170 (Figure 3) between the end of arm 189a and pawl 191 is eighty radial pins.

Accordingly, an indication is stored up by actuation of member 188 and its arm 189a for a particular rod and moving over of a pin 186 on the up-stroke of draw bar 31; whereas on the down-stroke thereof an indication is subtracted by actuation of pawl 191 by the eighty-first pin clockwise from the pawl 180.

Each of the rods 12-19 has a pawl 191 and associated mechanism for lowering the rod one step. Each pawl 191 is so located that it can only be acted on by a pin 186 which has been pushed to the right by lever 189a.

When a pin 186 engages pawl 191, it raises the end thereof. Pawl 191 is pivotally mounted at 193 on rod 192 which is vertically slidable in guides 194. The engaged end of pawl 191 is connected by tension spring 195 to lug 196 on rod 192. Stop 197 on rod 192 limits clockwise rotation of pawl 191 in response to spring 195 and appropriately positions pawl 191 for engagement by a pushed-over pin 186.

As the pin 186, which has been pushed over, raises the end of pawl 191, it raises rod 192 since spring 195 has a tension greater than the force exerted by the weight of rod 192 and by spring 57. Rod 192 has an arm 198 extending out beneath arm 58 of the escapement 55. Raising arm 192 raises pawl 198 to raise arm 58 and rotate pawl 60 out of engagement with tooth 50b. Rod 14 drops slightly but is held since pawl 60a of escapement 55 moves under tooth 50d. The drop of rod 14 is at this time, however, sufficient to cause the edge of tooth 50b to clear the end of pawl 60 of the escapement.

The pin 186 now moves past pawl 191 by extending spring 195. Rod 192 now drops, moving pawl 198 away from arm 58; and spring 57 restores escapement 55 to the position of Figure 3. Pawl 60a is withdrawn from under tooth 50d and pawl 60 enters beneath tooth 50e, and the rod 14 is thus stepped down one step.

The pin 186 which has actuated pawl 191 is now, in the course of its travel toward lever 189a, pushed back toward the left or non-storage position by the curved stationary plate 190; and is restored just prior to possible future actuation by lever 189a.

It will thus be seen that a re-setting or step-back operation for a rod takes place during the release stroke of the solenoid 30, whereas the advancing or raising operation of the rod occurs during the operating stroke. Accordingly where the first of the series of eighty devices tested had actuated rod 14 and the eighty-first happens to actuate rod 14, rod 14 remains in effect stationary, being raised on the up-stroke of member 31 and dropped back on the down stroke of member 31.

Thus, the actuation of any solenoid for any rod will, through lever 188 and its arm 189a, push over a pin 186 on the wheel 185 for that rod at a specific angular portion of drum 170. No other pin aligned with that pin will be pushed over. The next operation of a rod will push over a pin along the next line. At the completion of the predetermined number of actuations, the pin 186 which has first been pushed over will strike its pawl 191 to step back the rod which was first actuated.

In operation, the device is cleared with all rods 12-19 at zero position and all pins 186 at the left. This is effected by an extra complete revolution of the storage drum either manually or by any well known means, as by an electromagnet corresponding to electromagnet 30 having only parts corresponding to the pawl and ratchet 180 and 175. The magnet may be provided with a self make and break circuit of the well known type to effect rapid energization and de-energization thereof.

As the drum is rotated and no new settings are effected, this will cause a subtraction of the total, indicated by rods 12-19, as can be seen in Figure 3 where levers such as 192 operated by storage pins will cause the escapement mechanism such as 55 to subtract from the total registered on their associated rods, a number just equal to the number of levers which have been shoved to the right hand position of their slots. Since this number is just equal to the total count on the rods, the rods will be returned to their bottom position. Simultaneously all values stored in the storage drum will be removed by virtue of displacement of the levers therein to the left hand end of their respective slots, as previously described. Thus, by this re-setting means it is possible to make new tests which are exclusive of all previous tests. This is particularly applicable when the number of samples to be tested is less than the number of units N for which the storage drum has been designed.

Successive testings thereafter will raise different rods as different characteristics are recorded and push over a pin 186 for the rod raised. At the completion of a predetermined number, say eighty tests, the eighty-first actuation of a rod will be accompanied or immediately followed by the stepping back of the rod actuated in the first test; the eighty-second actuation of a rod will be accompanied or followed by the stepping back of the rod actuated in the second test; and so on.

This will continue with the rods registering at any instant only the last eighty tests. Where the distribution curve is to analyze more or less than eighty tests, then the number of pins clockwise between lever 189a and pawl 191 will be regulated accordingly.

Figure 4:
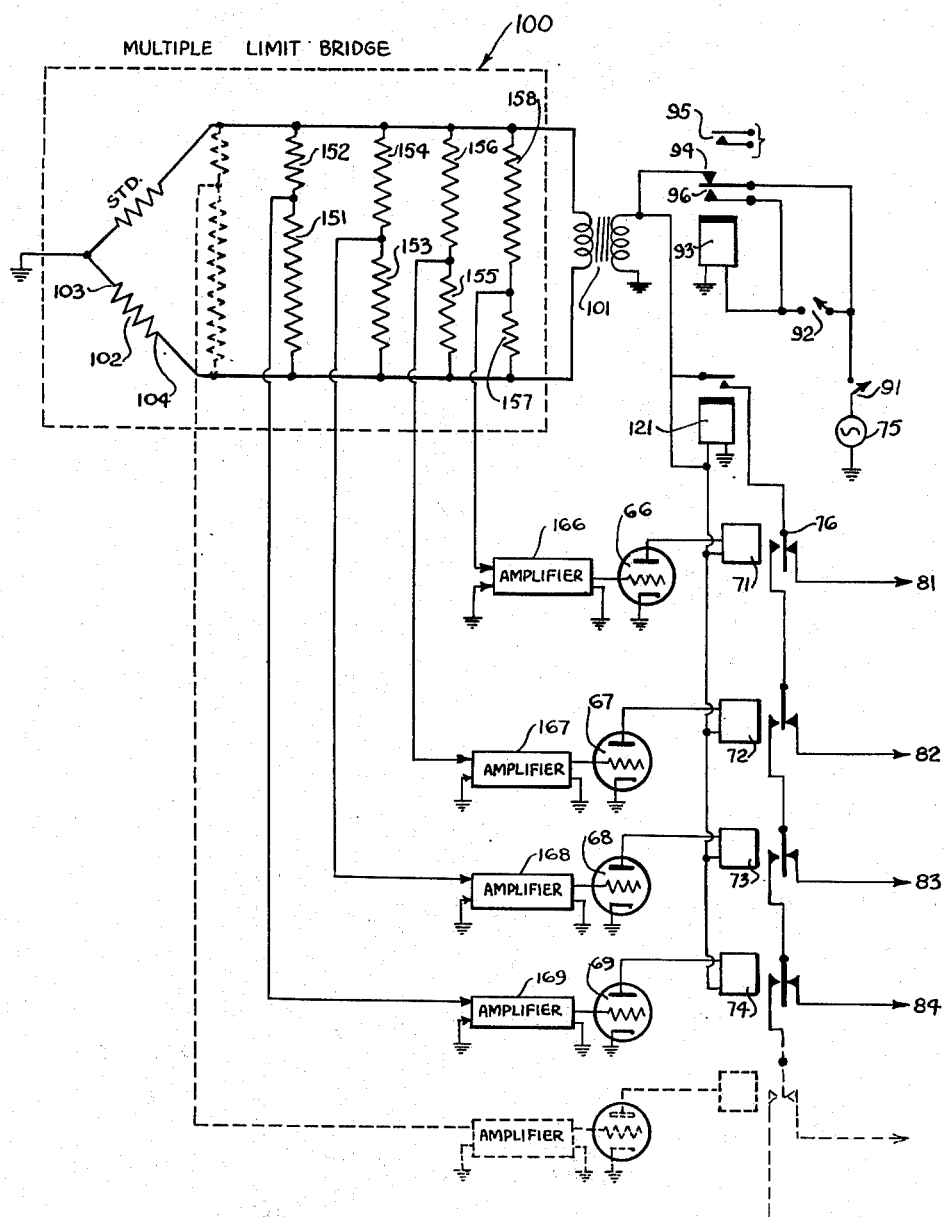
Figure 4 is a schematic view showing the association of the apparatus of Figures 1 to 3 with a resistance limit bridge for testing resistors for their distribution with respect to ohmic value.

Where, in addition to a current and instantaneous analysis of the last eighty (or other predetermined number) tests, a picture of all analyses is desired, card 21 may be a moving scale which may be completely displaced by another scale at every test, or every five or ten (or other number of tests) and rode 12-19 may carry record members to mark card 21 appropriately. This will give in effect a motion picture of the quality of an hour's or a day's production.

Where the devices to be tested comprise successive resistors, then the relationship of the rods shown in Figure 1 to a testing circuit through the mechanical system of Figure 3 is shown in Figure 4.

The apparatus shown in Figures 1-3 may, however, be readily used as a simple tabulating machine which may be manually operated. In this case each rod 31 for each of the counters 12-19 may be suitably operated by a button or key individual to each rod, suitably arranged to draw rod 31 up when pressed and drop it when released. Or solenoids 30 may each be individually operated by manual push-buttons to energize them when pressed, using a suitable relay if necessary to lock their respective circuits closed until rod 31 is raised and to open their respective circuits when rod 31 has completed its upward movement. The apparatus would then be useful for rapidly tabulating the results of tests which are now manually made, without the necessity for changing existing test apparatus. The manual tabulating apparatus will also be of value in some types of tests, particularly when production is small, which do not lend themselves to automatic procedures because of the relative costs.

In Figure 4 circuit 100, enclosed by the dotted line, is a multiple limit bridge which has been shown as a bridge for testing an unknown resistor. Various ratio arms of the multiple limit bridge for various limits are indicated. One construction I may use is shown in my application of even date, entitled "Electrical system," Serial No. 588,027, filed April 12, 1945.

Thus, the pair of resistors 151 and 152 form one limit test; the pair of resistors 153, 154 form another limit test; 155, 156 a third limit test; 157, 158 a fourth limit test, etc. This bridge is energized through a transformer 101 which is in turn energized from a source of alternating current 75.

When the resistor 102 having unknown characteristics is in position to be tested between test contacts 103 and 104, switch 91 is closed. This completes an energizing circuit through back relay contact 94 to the primary of transformer 101 for the multiple limit bridge 100. Simultaneously it energizes the plate circuit of the vacuum tube phase detectors 66, 67, 68, and 69 over a circuit including individual relays 71 to 74.

One of the outputs of the multiple limit bridge is fed into amplifier 166. If the unknown is of higher value than the limit set by the pair of resistors associated in the multiple limit bridge with amplifier 166, then tube 66 will be energized, which in turn will energize relay coil 71. This will operate relay contact 76 which will disconnect line 81, and connect the contact 76 onto the relay contact associated with coil 72. Relay contact 76 is fed from the contacts associated with slow acting relay 121. This relay is energized as soon as the system is energized, but is slow in acting and does not close until all of the relay contacts 76 are in their appropriate position; that is, the position dictated by the actual value of the unknown resistance. Then the relay contacts associated with relay 121 are closed and energy is fed out over the appropriate line 81, 82, 83 or 84, etc. to activate the solenoid 30 (Figure 3) which is connected to the appropriate rod.

Assume, for example, that the unknown is higher in value than the limit set by the combination of resistors set by 153 and 154 but is lower in value than the combination set by 151 and 152. Under these circumstances, phase detectors 66, 67 and 68 will all be energized, and consequently relays 71, 72 and 73 will be energized. However, relay 74 will be unoperated, as will all relays therebelow, indicated by the dotted circuits. As a result of this, lines 81, 82 and 83 will be disconnected, but line 84 will be connected through the relay sequence and through relay 121 to the source of power.

This line 84 is connected to the solenoid corresponding to solenoid 30 in Figure 3, and this coil is associated with the rod in Figure 1 which corresponds to the resistance between the limit given by resistors 153 and 154, and the limit given by the resistors 151 and 152. Thus, these two sets of resistors establish the edge or edges of the range of the associated rod in Figure 1; that is, the rod which is associated through the mechanism of Figure 3 to line 84 in Figure 4.

When the rod corresponding to rod 14 of Figure 3 has risen to its full travel, contactor 92 (Figure 3) is closed. This contactor 92 is also shown in Figure 4, and it applies power to relay coil 93 which is also a slow acting coil.

When this relay acts, relay contact 96 is pulled down to close its front contact to lock the relay, and back contact 94 is opened. This disconnects the limit bridge and consequently releases the solenoid 30, thereby opening contactor 92. At the same time, relay contacts 95 are closed. These contacts may initiate the unit advancing mechanism (not shown) which removes the resistor 102 which has been tested and advances the next unit to be tested in the test position. As the resistor which has been tested moves out of the test position, the mechanism causing such motion opens contacts 91, which in turn releases relay 93, which also in turn opens contact 95. However, this is satisfactory since contact 95 only needed to be contacted momentarily to start the changing of resistors. After this process has started, the operation may continue without maintaining the closure of contacts 95.

With contacts 91 opened, all relays return to their unenergized condition ready to start another test as soon as the new resistor to be tested has moved into position into the testing mechanism. The resistance limits set for the individual rods, shown in Figure 1, are established as has been seen by the values of the resistances used in the multiple limit bridge.

In order to obtain eight ranges as was shown in Figure 1, it is desirable to use in the multiple limit bridge nine different limit positions—that is, nine pairs of resistors, each pair of which establishes a definite tolerance limit. Likewise, it is desirable to use nine amplifiers, nine phase sensitive detectors, nine associated relays.

Under these circumstances, line 81 may be arranged so that it would not go to a solenoid which would operate a rod. Instead, it may be connected to operate an alarm system or indicating mechanism which would indicate that a resistor had been tested which fell completely outside of the range indicated on the horizontal scale of Figure 1.

Likewise the line, which would lead from the closed position of the lowest amplifier on the scale, would also indicate a resistor which was outside of the limit set on the scale of Figure 1. If it was felt desirable to do so, it could be so arranged that all of these outside limits could be recorded on Figure 1. This could be done by making the lowest range not 88 ohms ($\pm 2$) but zero to 90 ohms; and the highest range not 116 ohms ($\pm 2$) but 116 ohms or greater. Under these circumstances, seven sets of resistors may be employed in the multiple limit bridge, along with seven amplifiers, seven phase sensitive detectors and seven relays. The choice of which of these schemes will be used will, of course, depend upon the particular circumstances associated with the tests which are to be made.

It now can be seen that this invention allows the multiple unit limit test bridge to be applied to a system of relays which will operate a mechanical system in such a manner that the result of these tests is shown in a graphical form.

Furthermore, as has been shown, this mechanical mechanism can be so arranged as to store the result of test for a prescribed number of tests, and to then subtract the result of the test after a certain number of tests has gone by. In this manner the data shown on the indicator graph is the data for the last set of tests which have been made, and this data is continuous.

Summarizing the above, means are provided for obtaining a distribution curve of the quality of the manufactured product by automatic means. In substance, the quality measure of the manufactured product is divided into a series of groups. Thus, if 100 represents the desired quality value, the groups might range from 100 to 110, from 110 to 120, from 100 down to 90, from 90 down to 80, and so on each side of the normal value of 100. For each of these quality ranges there is associated an indicator rod. This indicator rod is raised to a level which corresponds to the number of units manufactured within a certain period of time which fell within this tolerance range. The entire series of such rods associated with the series of tolerance ranges, then provides a visual indication of the distribution curve of the manufacturing process over the last given number of articles manufactured.

As previously stated, in addition to the above-described indications, it is often desirable to establish certain other values such as the average value of the devices being manufactured, or the mean deviation of the product from the desired quality value. This average value may then be employed to effect automatic adjustment of the manufacturing process to maintain a predetermined mean production quality.

To effect this end, I provide further means whereby the positions of these rods are transcribed into electrical signals. This I do by associating with each of these rods a rheostat, the contact of which is moved as the rod is moved. Thus, the position of the contact on this rheostat provides an electrical signal proportional to the position of the rod, i. e., to its vertical position in the visual indicating scheme.

In order to secure the average value, I add together all of these indications, giving proper weight to the distance of the rod which is associated with the potentiometer from the normal or mean value desired. Thus a rod which is far below the central value or mean value is given a much smaller value than a rod which is quite a bit above the mean value.

Thus there is obtained the sum of the multiples of the average quality value for each range, times the number of devices in this range. This sum divided by the total number of devices over which the test is given is the average quality value.

In the earlier description of my invention, I show how a record is kept of the last special number of measurements made. For example, the deviation curve is recorded on the basis of the last 80 measurements being made. A storage device is used which removes the effect of each measurement upon the curve after 80 measurements have been recorded. Thus, the number of measurements upon which the curve is made is always the same—in the example cited this number was 80. Consequently, in the use of this device for determining the average, it is not necessary to carry out the dividing process, since the total number of devices involved is always the same, after at least 80 devices have been measured and tested. The dividing operation may be carried out at the start of the testing operations, however, prior to the time that 80 units have been tested in order to form the true average when the total number tested is less than the final number maintained in the counting mechanism.

In order to exactly measure the standard deviation of the curve, it is necessary as part of the process that the sum of the squares of the individual deviations from the mean be added. As a practical approximation of this process, the summation and deviation measurement is accomplished in accordance with my invention by connecting an A. C. responsive measuring circuit in rapid succession to the individual rheostats on the individual arms of the recording or indicating mechanism. A square law indicator is preferably used in the measuring circuit to provide an indication very closely approximating the standard deviation of the values of the components tested as registered upon the visual curve indicating mechanism of Figure 1. The reading provided by said indicator is then a good indication of the extent of dispersion of the quality of the manufactured article.

Thus, from each of the individual voltages appearing at the individual contact arms of the rheostats, the average of all said voltages is subtracted by means of a capacitor which is charged to the average value of these voltages. These individual voltages minus the average voltage are fed into a system responsive to the root-mean-square of the signal applied to the device. Such system could be, for instance, a dynamometer or thermal instrument. These instruments themselves, having inherently an averaging quality, will take the necessary average value of the squares of the input signals. Other means for doing this, such as a combination of a full-wave rectifier and a square law device such as a device covered in patent application Serial No. 549,112, filed August 11, 1944, by M. T. Bagley, now Patent No. 2,428,541, could of course be used for this purpose in conjunction with a direct current meter reading the output of the square law device.

Since this will make available readings which are proportional to the average of the values on the indicator and also to the standard deviation, it is possible to use these values for automatic controls. For example, the average value could be used to control the manufacturing process.

Thus, if the device being manufactured is a rod, and if its critical quality is its length, it would be possible to use the indication of the D. C. average indicating meter to control the position of the cutting tool which is cutting the length of the rod. If such a D. C. meter indicating average should go above predetermined limits, connections may be made so that the tool is moved in such a direction as to shorten the length of the next cut. Such a scheme could be used progressively and could keep the manufacturing process automatically in control, so that it is controlled to yield a given average value of the devices being measured.

In setting up such an automatic control system, it is, of course, necessary to take the precautions which must normally be exercised in designing servo mechanism systems to avoid unstable oscillations within this system. One thing should be noted here, of course, i. e., that the average value is an integration over a period of time of measurements just preceding the one actually being measured. Thus, a correction made from the average value should not be made too rapidly, since there is inherently a time lag between the average value and the instantaneous setting of the cutting tool in the above example.

In other words, if the average value should gradually creep upward so that it should become too high, then the cutting tool would be moved in the direction to cut to shorter length. The average value, then, begins to decrease, but the new average value does not follow immediately in proportion to the amount that the cutting tool had to be set to cut shorter rods.

Consequently, a possibility exists that the average value is still high, whereas the average value of those newly cut after the adjustment may be low, causing a possibility of unstable oscillation which must be guarded against in the proper design of the control system. Since such design considerations are in general individual to particular applications of my invention, and since stability conditions for feedback systems are well known in the art, it is deemed unnecessary to provide details of any particular stabilizing measures.

In a somewhat similar manner to that generally described above, the output of the mean square deviation meter may be employed to control various parts of the manufacturing process or may be employed to operate an alarm and to stop the operation of the machine which was making the device being tested, whenever the standard deviation exceeds a predetermined nominal value. Such an exceeding of a nominal value could be caused by a faulty operation of the machine, which could be adjusted by the operator in charge of the machine before starting the machine again.

Figure 5:
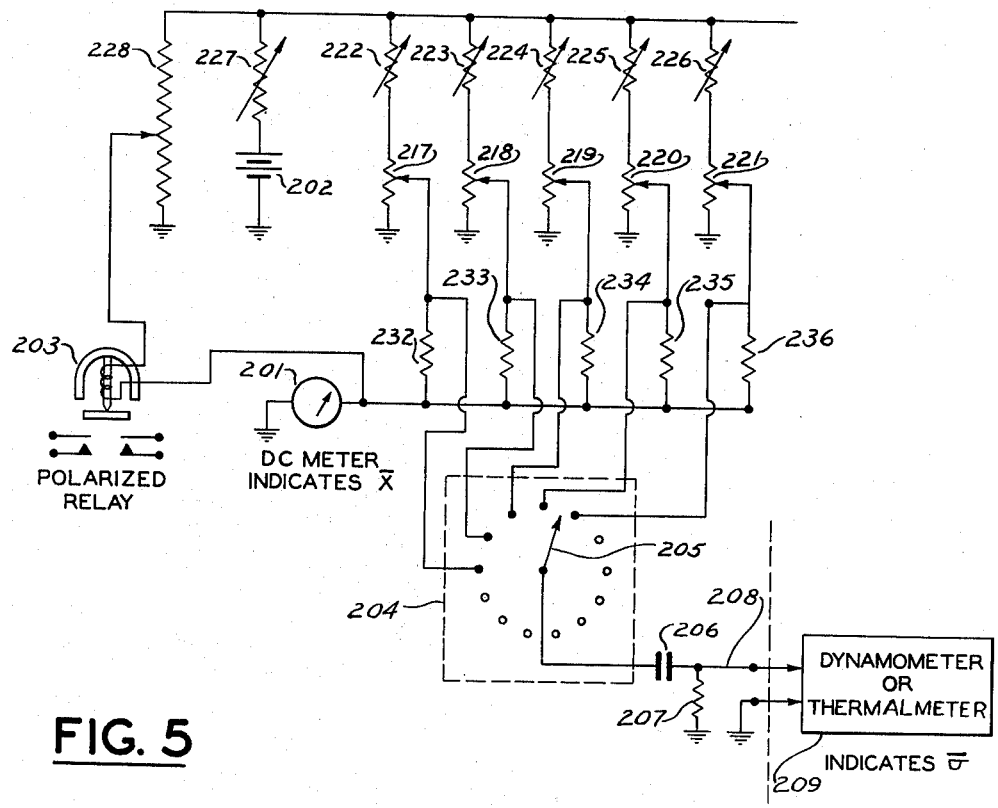
Figure 5 is a circuit diagram showing an arrangement for measuring average values and standard deviation of value.

Referring now to Figure 5, $\overline{X}$, the average value of the measurement being made is indicated on the direct current instrument 201. Power for the entire system is supplied by a source of direct current 202. This power is supplied through rheostat 227, whose function will be described later. Current is then fed through a series of resistors 217 to 226 to ground. Resistor 219, for example, is supplied through resistor 224, and the adjustable contact of resistor 219 is fastened to its associated vertical rod shown in Figure 1 in connection with the distribution curve. Only five such resistors are shown here for purposes of illustration, but it will be understood that a variable resistor such as 219 with its associated circuits is provided individually for and controlled by each of the rods 12 to 19 of Figure 1. Each rod as it moves, moves the sliding contact of the resistor to correspondingly increase or decrease the resistance in the circuit, as will be explained hereinafter.

For the purpose of explanation, I assume here that this rheostat 219 is associated with that particular rod in my quality curve indicating mechanism which indicates a quality between 90 and 110. The current through this resistor 219 is set at a nominal value by adjustment of rheostat 224. This nominal value may be 100 on a relative scale. Resistor 220 is fastened to the next vertical rod in my distribution curve indicator. Resistor 220 is of the same value as resistor 219 and is fed through rheostat 225. Rheostat 225 is manually adjusted, however, so that the relative current through resistor 220 is 120. This is done because the rod which is fastened to the slider on rheostat 220 is the rod which gives the number of measurements which fall within the range of 110 to 130. 120 is the average of the limit values. Likewise, resistor 221 is fed through rheostat 226 which is so adjusted manually that the relative current through resistor 221 is 140. This is done because the slider on rheostat 221 is fastened to the rod which indicates measurements made between 130 and 150. 140 is the average of these limiting values. A similar situation holds for rheostat 218. This is fastened to the slider which indicates readings occurring between 70 and 90. Thus, resistor 223 is also manually adjusted so that the current flowing through resistor 218 is 80 on a relative scale. Resistor 222 is also adjusted manually so that the current flowing through resistor 217 is 60 on a relative scale, coinciding with the fact that resistor 217 has its slider mounted on the rod which gives the reading falling between 50 and 70. Thus, the currents flowing through resistors 217, 218, 219, 220 and 221 are directly proportional to the quality value indicated by the indicating rod to which the sliders of these resistors are fastened.

The output voltages from the sliders on these resistors are used to provide current for a series of resistors 232, 233, 234, 235 and 236. The resistance value of these resistors is preferably very much higher than any other resistor 217 through 226.

Thus, the presence of these resistors on the sliders does not in any substantial way alter the voltages appearing on these sliders over what this voltage would be if there were nothing attached to the slider. In consequence of this, the voltage at the contact arm of resistor 217 is proportional to the displacement of the slider on resistor 217, times the current flowing through the resistor 217.

This is another way of saying that the voltage at the contact arm of resistor 217 is proportional to the product of the quality value associated with resistor 217 times the number of units which fell within this quality value.

A similar situation holds for resistors 218, 219, 220 and 221; each one producing a voltage at its contact arm which is proportional to the quality value of its associated sliding rod, times the number of measured units which fell within this quality range.

The average of all these voltages, then, is the summation of quality values times the number of units appearing within each quality value. This average voltage needs only to be divided by the number of measurements to obtain the average value of the components being measured. The average voltage, or a voltage proportional thereto, is achieved merely by sending the current of the individual resistors 232, 233, 234, 235, 236 through the common D. C. indicating meter 201.

The division by the total number of measurements made is accomplished fundamentally by the calibration of the scale of this D. C. instrument 201, and corresponds with the total number of measurements used for the curve indication of Figure 1.

If, however, it is desired that the average be kept from the very beginning of making of measurements, the device as described up to the present will not suffice, because the division by the number of measurements will be incorrect. For example, after only ten measurements have been made, the settings of rheostats 217, 218, 219, 220 and 221 correspond only to ten measurements. The calibration of the instrument 201 will still perform a division by the total number of measurements that will eventually be used. Compensation for this effect can conveniently be made by adjustment of rheostat 227.

Thus, if the total number of measurements to be made eventually is 80, and only ten measurements have been made to the present time, rheostat 227 would be so set that eight times as much current would be fed out of D. C. source 202 as was required for later operation. The division of this current among resistors 217, 218, 219, 220 and 221 is still accomplished by resistors 222, 223, 224, 225 and 226, without any further adjustment of these resistors.

Consequently, it is necessary that as the number of measurements over which the average is to be taken is increased, the setting of the resistance of 227 should also be increased. This can be accomplished by fastening the rotatable arm of the rheastat 227 to the shaft of storage drum of Figure 1, so that as soon as a measurement has been made, the rheostat 227 will go into operation, and as the successive measurements are made, the resistance of rheostat 227 will continually be increased, so that less and less current will be supplied to the system.

When the full number of measurements, for example, 80 as described, have been obtained, it is necessary that further changes in the setting of rheostat 227 be avoided. This can be done by coupling rheostat 227 to the storage drum of Figure 1 through a slip clutch which will slip after the storage drum has rotated from its initial setting by an amount corresponding to the clockwise angle between lever 189a and lever 191 of Figure 3. The proper angle at which slipping begins to occur can be accurately maintained by providing the sliding arm of this rheostat with a satisfactory mechanical stop.

In order to use this average value to automatically control the manufacturing operation, a rheostat 228 is provided. This rheostat is so set that the voltage drop from ground to the slider on this rheostat is substantially the same as the voltage drop across the D. C. indicating instrument 201 during the time when this indicating instrument indicates the average value which it is desired to achieve in the manufacturing process. Under these circumstances, no current will flow through the polarized relay 203.

If, however, the reading of the average value of the parts being manufactured drops below the value desired, the voltage drop across meter 201 will become less than the voltage drop from ground to the sliding tap on rheostat 228.

Accordingly, current will flow from the tap on rheostat 228 through the polarized relay 203 to the terminal of the D. C. indicating meter. This will cause operation of the polarized relay 203 which will close one pair of contacts to initiate a predetermined change in one direction of the manufacturing or fabrication process.

If on the other hand the average value of the indication on D. C. meter 201 increases above the desired value, a current will flow in the opposite direction through the polarized relay 203. This will so operate the relay 203 that the alternate contacts close to make an adjustment in the manufacturing or fabrication process in the opposite direction to the previous adjustment. Each of these adjustments, of course, is in the direction which would cause the average value indicated by meter 201 to return to the normal value.

In setting up such a system it is necessary, of course, that all those precaution and design procedures which are necessary in designing Servo mechanisms should be used to prevent unstable oscillation of the system and to provide satisfactory speed of response of the system.

In order to measure the standard deviation of the curve of Figure 1, the voltages at the contact arms of potentiometers 217, 218, 219, 220 and 221 are fed to the contacts of a rotary switch 204. The rotary arm 205 makes contact with each one of these contacts in quick succession, and for proper operation this rotary arm should be in contact with each one of these contact surfaces for the same length of time. This is accomplished by having equal arcs of contact surfaces and by rotating the arm 205 at a uniform rate of speed of, say, 100 to 1000 revolutions per minute.

Electrically, the voltage at this contact arm is passed through an RC network composed of resistor 207 and capacitor 206 and then over conductor 208. The purpose of this RC network is to subtract out from the individual voltages at the contactors of potentiometers 217 to 221 the average value of these voltages. This is the same average value as is indicated by meter 201, but it is obtained here by the use of the RC network. It is well known in electrical theory that in such an RC network the potential across capacitor 206, if it is sufficiently large, becomes eventually steady and substantially equal to the average potential supplied to it, in this case by the rotating arm 205. Accordingly, there will appear across resistor 207 in quick succession the individual voltages at the contacting arms of rheostats 217, 218, 219, 220 and 221, minus in each case the average value of all of these voltages.

Thus, appearing on line 208 there is the deviation of each one of these voltages at the arms of rheostats 217 to 221, inclusive. These deviations are the deviations from the average value of the quality being measured. Furthermore, these deviations appear in quick succession and each one appears for the same length of time.

These are fed into a suitable instrument which is preferably responsive to the square of the signal applied to it. Thus, if the responsive instrument, in this case instrument 209, has no lag whatsoever, it instantaneously will take on readings proportional to the square of the deviation of the voltages at each one of the contacts of switch 204 in succession. Thus these readings of an instantaneous response instrument would in succession be proportional to the square deviation times the number of devices which had been measured which have this particular deviation.

It is the square root of the average of these products which is known as the root mean square deviation, which in most distribution curves is substantially equal to the standard deviation. This average is very conveniently obtained automatically by the nature of instrument 209, since this instrument inherently has a lag which prevents it from following the rapid fluctuation of signals supplied by the rotating arm 205. Thus, the reading of instrument 209 becomes the standard deviation or the mean square deviation of the values indicated by the settings of resistors 217, 218, 219, 220 and 221.

In the preceding discussion it has been assumed that there were only 5 indicating strips on the distribution curve indicator from which the mechanism operates. This, of course, is only for the purpose of explanation, since in practice any desired number of indicating strips may be used. Associated with each indicating strip there would be a succession of resistors corresponding to resistors 222, 217 and 232. There also would be a position on rotary switch 204 for each one of the resistor sequences.

Rotary switch 204 as shown contains positions for eight more resistor elements. It is understood that preferably this particular rotary switch should not be used without some means of making a signal occur during the time when the rotary switch is passing over the blank position, since this would cause a false reading on the instrument 209. In actual practice, the rotary switch is designed with the same number of elements on it that are used on the indicating strip mechanism showing the distribution curve.

Figure 6:
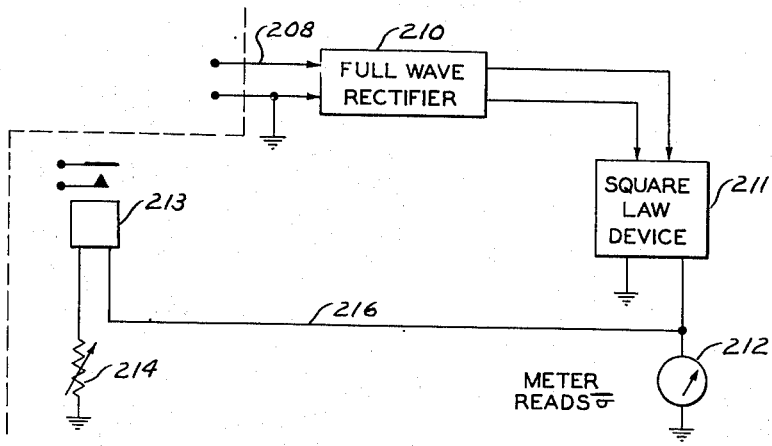
Figure 6 shows an alternative method of obtaining the mean square deviation.

Figure 6 shows an alternative method of obtaining a reading. This circuit is an alternative for the instrument 209 of Figure 5. Signal is fed on line 208 to a full wave rectifier 210, the signal output of which is fed to a square law device 211. The output of this square law device is fed to a D. C. instrument 212 which has a scale indication proportional to the square root of the current passing through the instrument, and which reads the root mean square deviation. In shunt with this instrument there also is placed a relay 213 with an adjustable resistor 214 in series. This relay is for the purpose of providing an alarm should the standard deviation exceed a given value. Under appropriate circumstances, such a relay could also be used for controlling or adjusting a manufacturing process.

In operation, this system first of all converts the negative deviations to positive deviations in the full wave rectifier. It then converts these into squared deviations in the square law device. The output of this then goes to the meter 212 which carries out the averaging process because of its inertia effect. The full wave rectifier is essential in this case only if the square law device has only one region of operation, i. e., if it operates only for a positive applied voltage. If a square law device for both positive and negative applied voltages is employed, the full wave rectifier element is not necessary. In fact, under these circumstances the square law device may turn out to be merely the thermocouple employed in the thermal instrument 209 of Figure 5.

Summarizing, this latest described embodiment of my invention provides a means or mechanism for obtaining on an instrument a reading of the average value of a series of measurements. Likewise, my invention provides a means for measuring or reading on an indicating meter the standard deviation or extent of dispersion of such a series of measurements. Such a pair of instruments would be of considerable value for controlling a manufacturing process, for the operator could then tell at a glance the consistency and the trend of his operating procedure and his manufacturing process. He could make or there could be made automatically appropriate adjustments to compensate for whatever trends there were.

Since I have described, above, my invention only with reference to a specific circuit in a specific mechanism, I prefer to have the invention described by the following claims.

I claim:

1. In a system for measuring deviations of the quality of devices being tested from a standard, means for testing the devices, comprising a plurality of branch circuits, means for adding the sum of the squares of individual deviations from the mean thereof comprising an A. C. responsive measuring circuit having a square law indicator connected thereto, a rheostat in each branch operated in accordance with the tests of said devices, and means including circuit connections to said square law indicator and said rheostats for indicating on said square law indicator the extent of dispersion of the quality of the device being tested.

2. In a system for measuring deviations of the quality of devices being tested from a standard, means for testing the devices, comprising a plurality of bridge circuits, means for adding the sum of the squares of individual deviations from the mean thereof comprising an A. C. responsive measuring circuit having a square law indicator connected thereto, a rheostat in each branch operated in accordance with the tests of said devices, means including circuit connections for applying a voltage at the individual branch of each rheostat corresponding to the values of the devices being measured, means for successively connecting said measuring circuit to each of said rheostats, and means including circuit connections to said square law indicator and said rheostats for indicating on said square law indicator the extent of dispersion of the quality of the device being tested.

3. In a system for measuring deviations of the quality of devices being tested from a standard, means for testing the devices, comprising a plurality of bridge circuits, means for adding the sum of the squares of individual deviations from the mean thereof comprising an A. C. responsive measuring circuit having a square law indicator connected thereto, a rheostat in each branch operated in accordance with the tests of said devices, circuit connections including a capacitor connected in said measuring circuit for charging said capacitor to the average value of the voltages of said rheostats, means including said capacitor for subtracting from each of the individual voltages appearing at the individual contact arms of said rheostat, the average value of the voltages, and means for feeding said individual voltages minus the average voltage to said indicator, said indicator being responsive to the root mean square of the signal applied.

4. In a system for measuring deviations of the quality of devices being tested from a standard, means for testing the devices, a variable impedance element individual to each of the ranges of quality of the devices being tested, means operated in accordance with the results of said testing means for varying said impedance element to correspondingly change the impedance thereof as devices being tested are found to have a value in the range with which said impedance element is associated, an indicating meter, and means including circuit connections from said impedance elements to said indicating meter for indicating thereon the average value of said tested devices.

5. In a system for measuring deviations of the quality of devices being tested from a standard, means for testing the devices, a variable resistor individual to each of the ranges of quality of the devices being tested, means controlled by said testing means for varying said resistor to correspondingly change the resistance as devices being tested are found to have a value in the range with which said resistor is associated, an indicating meter, means including circuit connections from said resistors to said indicating meter for indicating thereon the average of all the voltages at the adjustment contacts of said resistors, a resistance, circuit connections including said resistance for producing a voltage thereacross equal to the voltage across said indicating meter when the indicating meter indicates a given value, and control means included in the circuit of said resistance and said indicating meter and responsive to a difference in voltage across said resistance compared to the voltage across said indicating meter.

6. In a system for measuring deviations of the quality of devices being tested from a standard, means for testing the devices, a variable resistor individual to each of the ranges of quality of the devices being tested, means operated in accordance with the results of said testing means including circuit connections for producing voltages at the adjustment contact of each of said variable resistors proportional to the product of the quality value individual to each resistor times the number of devices which tested within this quality value, an indicating device, and means including circuit connections from said resistors to said indicating device for indicating therein the average of all the voltages at the adjustment contacts of said resistors.

7. In a system for measuring deviations of the quality of devices being tested from a standard, means for testing the devices, a variable resistor individual to each of the ranges of quality of the devices being tested, means operated in accordance with the results of said testing means for varying said resistor to correspondingly change the resistance as devices being tested are found to have the value with which said resistor is associated, means for normally setting each of said resistors at a relative value individual to a particular quality of the devices being tested, a D. C. indicating meter calibrated to correspond to the total number of devices whose average is being taken, and means including circuit connections from said resistors to said indicating meter for indicating thereon the average of all the voltages at the adjustment contacts of said resistors.

8. In a system for production control, means for testing devices being manufactured to determine whether they have values within predetermined limits, a mechanism comprising a plurality of indicators individual to predetermined ranges of values of the devices, means responsive to said testing means for selectively operating the indicator corresponding to the value of the device under test, means controlled by said indicators for measuring the deviations of the quality of the devices from a standard, said means comprising a measuring mechanism having a plurality of branch circuits, means for adding the sum of the squares of individual deviations from the mean thereof comprising an A. C. responsive measuring circuit having a square law indicator connected thereto, a rheostat in each branch, and means including circuit connections to said square law indicator and said rheostats for indicating on said square law indicator the extent of dispersion of the quality of the device being tested.

9. In a system for production control, means for testing devices being manufactured to determine whether they have values within predetermined limits, a mechanism comprising a plurality of indicators individual to predetermined ranges of values of the devices, and means responsive to said testing means for selectively operating the indicator corresponding to the value of the device under test and for deleting the indication of the earliest device tested, a measuring mechanism having a plurality of branches, a variable resistance in each branch controlled by said indication for varying the resistance in accordance with variable operation of each of said indicators, and circuit connections including said resistors for measuring the average value of the results of the devices tested.

10. In a system for production control, means for testing a plurality of devices for a predetermined characteristic and for classifying each of said devices tested into one of a plurality of groups, each group representing numerical differences of the tested characteristic of the devices, mechanism individual to each group and selectively operated by said testing means in accordance with the group into which the device tested falls, an energizable electrical circuit, a meter device connected in said electrical circuit, impedance means forming part of said electrical circuit, said mechanism being controlled by said testing means for varying the impedance value of said impedance means in accordance with the operation of said mechanism for continuously indicating on said meter device the average value of the results of said testing means.

11. In a system for production control, means for testing a plurality of devices for a predetermined characteristic and for classifying each of said devices tested into one of a plurality of groups, each group representing numerical differences of the tested characteristics of the devices, an energizable electrical circuit including a plurality of impedances connected in parallel with respect to each other, each impedance being individual to each group, means controlled by said testing means for selectively varying the impedance value of an associated impedance in accordance with the group into which the device tested falls, and a meter connected in said electrical circuit and operated in accordance with the impedance value of said circuit as determined by the impedance value of the individual parallel impedances.

12. In a system for production control, means for testing a plurality of devices for a predetermined characteristic and for classifying each of said devices tested into one of a plurality of groups, each group representing numerical differences of the tested characteristics of the devices, an energizable electrical circuit including a plurality of impedances individual to each group and selectively varied in impedance value by said testing means in accordance with the group into which the device tested falls, and a visual indicating device connected in said electrical circuit and operated in accordance with average value of said impedances.

13. In a system for production control, means for testing a plurality of devices for a predetermined characteristic and for classifying each of said devices tested into one of a plurality of groups, each group representing numerical differences of the tested characteristics of the devices, counter mechanism individual to each group and selectively operated by said testing means in accordance with the group into which the device tested falls, an energizable electrical circuit including impedances varied by said counter mechanism in accordance with the operation of said counter mechanism for producing an electrical signal and a meter connected in said electrical circuit and operated by said signal.

14. In a system for production control, means for testing a plurality of devices for a predetermined characteristic and for classifying each of said devices tested into one of a plurality of groups, each group representing numerical differences of the tested characteristics of the devices, an energizable electrical circuit including a plurality of impedances connected in parallel, each impedance being individual to one of said groups, means controlled by said testing means for selectively varying the impedance value of said impedances in accordance with the group into which the device tested falls, and a meter connected in said electrical circuit and operated in accordance with the impedance value of said plurality of impedances.

DAVID E. SUNSTEIN.

REFERENCES CITED

The following references are of record in the file of this patent:

UNITED STATES PATENTS

| Number | Name | Date |
|---|---|---|
| 1,228,392 | Beighlee | June 5, 1917 |
| 1,732,987 | Rowell | Oct. 22, 1929 |
| 2,162,767 | Thurlaw | June 30, 1939 |
| 2,168,443 | Johnson | Aug. 8, 1939 |
| 2,343,240 | Molins | Mar. 7, 1944 |
| 2,398,987 | Zeibolz | Apr. 23, 1946 |
| 2,398,988 | Ziebolz | Apr. 23, 1946 |

OTHER REFERENCES

Quality Control When Manufacturing to Specification, by B. P. Dudding. Pages 60 to 64 of G. E. C. Journal of Aug. 1944.